US 6,694,086 B2

(12) United States Patent
Furuyama

(10) Patent No.: US 6,694,086 B2
(45) Date of Patent: *Feb. 17, 2004

(54) REPRODUCING APPARATUS HAVING EDITING FUNCTION

(75) Inventor: Hiroaki Furuyama, Tachikawa (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 67 days.

(21) Appl. No.: 08/897,294

(22) Filed: Jul. 21, 1997

(65) Prior Publication Data
US 2001/0002222 A1 May 31, 2001

(30) Foreign Application Priority Data

Jul. 24, 1996 (JP) .............................. 8-194523

(51) Int. Cl.⁷ .......................... H04N 5/76; H04N 5/225
(52) U.S. Cl. .......................... 386/52; 386/64; 348/239; 348/333.01
(58) Field of Search ............................. 386/4, 52, 55, 386/64; 348/734, 239, 333, 334, 333.01; 345/328, 723–726

(56) References Cited

U.S. PATENT DOCUMENTS

| | | | | |
|---|---|---|---|---|
| 4,916,682 A | * | 4/1990 | Tomoda et al. ................ 386/52 |
| 5,532,830 A | * | 7/1996 | Schuler ........................ 386/52 |
| 5,760,767 A | * | 6/1998 | Shore et al. .................. 345/328 |
| 5,809,204 A | * | 9/1998 | Young et al. .................. 386/83 |
| 5,815,631 A | * | 9/1998 | Sugiyama et al. ............. 386/52 |
| 5,877,781 A | * | 3/1999 | Tomizawa et al. ........... 345/328 |
| 5,897,216 A | * | 4/1999 | Furuyama ..................... 386/52 |
| 5,930,445 A | * | 7/1999 | Peters et al. .................. 386/52 |
| 5,949,954 A | * | 9/1999 | Young et al. .................. 386/83 |
| 5,953,481 A | * | 9/1999 | Watanabe et al. ............. 386/52 |
| 6,124,804 A | * | 9/2000 | Kitao et al. .................. 348/734 |

* cited by examiner

Primary Examiner—Thai Tran
(74) Attorney, Agent, or Firm—Robin, Blecker & Daley

(57) ABSTRACT

A reproducing apparatus having an editing function is arranged to, in response to an instruction for setting an editing program, generate a display image signal corresponding to the contents of the set editing program, to, in response to an instruction for execution of an action verification, generate a display image signal corresponding to contents of an action of a recording apparatus actually used as an external recording apparatus according to a remote operation control command transmitted to the actually used recording apparatus, and to, in response to an instruction for execution of an editing action, generate a display image signal corresponding to a status of progress of the set editing program. The arrangement enables the operator to clearly know how a verifying action is being executed for confirming whether or not the actually used recording apparatus can be remotely operated by the reproducing apparatus, how the editing work is progressing and how the reproducing apparatus is operating.

18 Claims, 9 Drawing Sheets

FIG. 5

```
<MENU>                       STOP
    C.SELECT ------- TIME CODE
    DUB.MODE ------- ON
    SENSOR --------- ON
40 ▶ RECORDER SELECT --- 1-A
    CUT-IN    ADJUST ---- 0.0
    CUT-OUT   ADJUST ---- 0.0
42  RECORDER ; REC
44  CUT-OUT         +4.3
```

FIG. 6

```
<MENU>                       STOP
    C.SELECT ------- TIME CODE
    DUB.MODE ------- ON
    SENSOR --------- ON
40 ▶ RECORDER SELECT --- 1-A
    CUT-IN    ADJUST ---- 0.0
    CUT-OUT   ADJUST ---- 0.0
43  RECORDER ; REC PAUSE
```

REPRODUCING APPARATUS HAVING EDITING FUNCTION

BACKGROUND OF THE INVENTION

1. Field of the Invention

The present invention relates to a reproducing apparatus having an editing function of performing, by using an external recording apparatus which is remotely operable, editing of signals recorded on a recording medium.

2. Description of Related Art

In performing, by using an external recording apparatus which is remotely operable, editing of signals recorded on a recording medium, the conventional reproducing apparatus has been provided with no means for confirming that the remote operation can be accurately carried out with remote operation control command codes being used for the remote operation control. Further, in adjusting the timing of transmitting the remote operation control command codes and the timing of actual start of operation of the recording apparatus to each other, the operator of the conventional reproducing apparatus has been necessitated to arrange and use an additional clock for measuring a time lag.

It has been another problem with the conventional reproducing apparatus that, when acceptance of remote operation commands is inhibited to prevent an erroneous operation within the reproducing apparatus, which is on the side of transmitting signals to an external recording apparatus, while the editing operation is in process, no display is provided for informing the operator of the inhibition of acceptance of remote operation commands.

It has been a further problem that the display area of display means of the conventional reproducing apparatus is limited. Therefore, in the conventional reproducing apparatus, it has been hardly possible to accurately display information apposite to each of operation modes of varied kinds.

In other words, the problems of the conventional reproducing apparatus include a shortcoming that, during the process of verifying the actions of command codes to find if a remote operation can be accurately carried out with the command codes being used, the conventional reproducing apparatus is incapable of clearly informing the operator as to when a command code is transmitted and how the external recording apparatus is acting in response to the command code.

Another problem in the conventional reproducing apparatus lies in that, in adjusting a time lag between the timing of transmitting a command code and the timing of the commencement of an action of the recording apparatus, the adjustment necessitates a very troublesome operation as follows. First, editing work must be tentatively performed by using a recording medium on which time information is recorded. After that, a time lag adjustment value must be computed by reproducing information from the edited recording medium.

A further problem lies in that no information on the inhibition of acceptance of remote operation commands within the reproducing apparatus is displayed even when acceptance of remote operation commands on the side of the reproducing apparatus is inhibited for the purpose of preventing an erroneous operation while an editing operation is in process. The absence of such a display sometimes confuses the operator, because the operator cannot instantly understand why the remote operation onto the reproducing apparatus has become invalid.

A still further problem with the conventional reproducing apparatus lies in that a display is made in the same mode both during a process of setting an editing program and during a process of executing an editing operation. Some of display items that cannot be displayed while an editing program is in a setting process but must be displayed while an editing operation is in process, such as a date or the like, therefore, sometimes cannot be displayed even while the editing operation is in process, because of an insufficient display space.

BRIEF SUMMARY OF THE INVENTION

It is a general object of the invention to provide a reproducing apparatus having an editing function, which is arranged to be capable of solving the above-stated problems.

It is a more specific object of the invention to provide a reproducing apparatus having an editing function, which is arranged to be capable of allowing the operator to clearly know how a verifying process is being executed for finding whether or not a recording apparatus actually used as an external recording apparatus can be remotely operated by the reproducing apparatus, how an editing operation is progressing and also how the reproducing apparatus is operating.

To attain the above object, in accordance with an aspect of the invention, there is provided a reproducing apparatus having an editing function of editing, by using a remotely operable external recording apparatus, an information signal recorded on a recording medium, which comprises (A) editing program setting instructing means for giving an instruction to set at least one editing program, (B) action verifying execution instructing means arranged to store beforehand a plurality of kinds of remote operation control data codes for remotely controlling recording apparatuses each usable as the external recording apparatus, in correspondence to the respective usable recording apparatuses, and arranged to, prior to execution of an editing action, give an instruction to execute an action verifying operation of (i) selecting remote operation control data codes corresponding to a recording apparatus actually used as the external recording apparatus from among the stored plurality of kinds of remote operation control data codes, (ii) transmitting to the actually used recording apparatus a remote operation control command according to a remote operation control data code for causing the actually used recording apparatus to perform a predetermined action among the selected remote operation control data codes corresponding to the actually used recording apparatus, and (iii) confirming whether or not a remote operation can be accurately performed by using the selected remote operation control data codes corresponding to the actually used recording apparatus, (C) editing action execution instructing means arranged to transmit to the actually used recording apparatus remote operation control commands according to remote operation control data codes for causing the actually used recording apparatus to act in accordance with the set editing program, and arranged to give an instruction to execute, by using the actually used recording apparatus, an editing action on the information signal recorded on the recording medium in accordance with the editing program, (D) display image signal generating means arranged to, in response to the instruction for setting of the editing program by the editing program setting instructing means, generate a display image signal corresponding to contents of the set editing program, arranged to, in response to the instruction for execution of the action verifying operation by the action verifying execution instructing means, generate a display image signal corresponding to contents of the action of the actually used recording apparatus performed according to the transmitted remote operation control command, and arranged to, in response to the instruction for execution of the editing action by the editing action execution instructing means, generate a display image signal corresponding to a status of progress of the set editing program, and (E) reproducing means for, in response to the instruction for execution of the editing action by the editing action execution instructing means, reproducing the information signal recorded on the recording medium and outputting the reproduced information signal to the actually used recording apparatus according to the set editing program.

It is another object of the invention to provide a reproducing apparatus having an editing function and arranged to be capable of accurately setting the timing of transmitting remote operation control commands to a recording apparatus, without necessitating any special operation, for a remote operation on the recording apparatus, which is actually used as an external recording apparatus.

To attain the above object, in accordance with another aspect of the invention, there is provided a reproducing apparatus having an editing function of editing, by using a remotely operable external recording apparatus, an information signal recorded on a recording medium, which comprises (A) display image signal generating means for generating display image signals indicative of various operating states of the reproducing apparatus, (B) transmitting means arranged to store beforehand a plurality of kinds of remote operation control data codes for remotely controlling recording apparatuses each usable as the external recording apparatus, in correspondence to the respective usable recording apparatuses, and arranged to transmit, to a recording apparatus actually used as the external recording apparatus, remote operation control commands according to remote operation control data codes corresponding to the actually used recording apparatus among the stored plurality of kinds of remote operation control data codes, (C) reproducing means for reproducing the information signal recorded on the recording medium and outputting the reproduced information signal to the actually used recording apparatus, (D) instructing means arranged to have a selecting mode of selecting the remote operation control data codes corresponding to the actually used recording apparatus from among the plurality of kinds of remote operation control data codes stored in the transmitting means, a transmitting mode of transmitting to the actually used recording apparatus a remote operation control command according to a remote operation control data code for causing the actually used recording apparatus to perform a predetermined action among the remote operation control data codes selected in the selecting mode, an adjusting mode of adjusting transmission timing of the remote operation control command to be transmitted in the transmitting mode to the actually used recording apparatus, and an editing execution mode of causing the transmitting means to transmit to the actually used recording apparatus remote operation control commands according to remote operation control data codes for causing the actually used recording apparatus to act in accordance with a preset editing program and of executing, by using the actually used recording apparatus, an editing action on the information signal recorded on the recording medium in accordance with the editing program, and arranged to give an instruction to cause the reproducing apparatus to act in accordance with one of the selecting mode, the transmitting mode, adjusting mode and the editing execution mode, and (E) control means (i) arranged to, in response to the instruction by the instructing means for causing the reproducing apparatus to act in accordance with the transmitting mode, cause the transmitting means to transmit the remote operation control command to the actually used recording apparatus and cause the display image signal generating means to generate a display image signal corresponding to contents of the action of the actually used recording apparatus according to the transmitted remote operation control command and corresponding to the transmission timing of the remote operation control command, (ii) arranged to, in response to the instruction by the instructing means for causing the reproducing apparatus to act in accordance with the adjusting mode, set the transmission timing of the remote operation control command to be transmitted by the transmitting means, and (iii) arranged to, in response to the instruction by the instructing means for causing the reproducing apparatus to act in accordance with the editing execution mode, cause the transmitting means to transmit the remote operation control commands according to the editing program, cause the reproducing means to reproduce the information signal recorded on the recording medium in accordance with the editing program and cause the display image signal generating means to generate a display image signal corresponding to a status of progress of the editing program.

These and other objects and features of the invention will become apparent from the following detailed description of an embodiment thereof taken in connection with the accompanying drawings.

BRIEF DESCRIPTION OF THE SEVERAL VIEWS OF THE DRAWING

FIG. 5 shows an example of a display made in the editing menu mode in the embodiment.

FIG. 6 shows another example of a display made in the editing menu mode in the embodiment.

DETAILED DESCRIPTION OF THE INVENTION

Hereinafter, a preferred embodiment of the invention will be described in detail with reference to the drawings.

Figure 1:
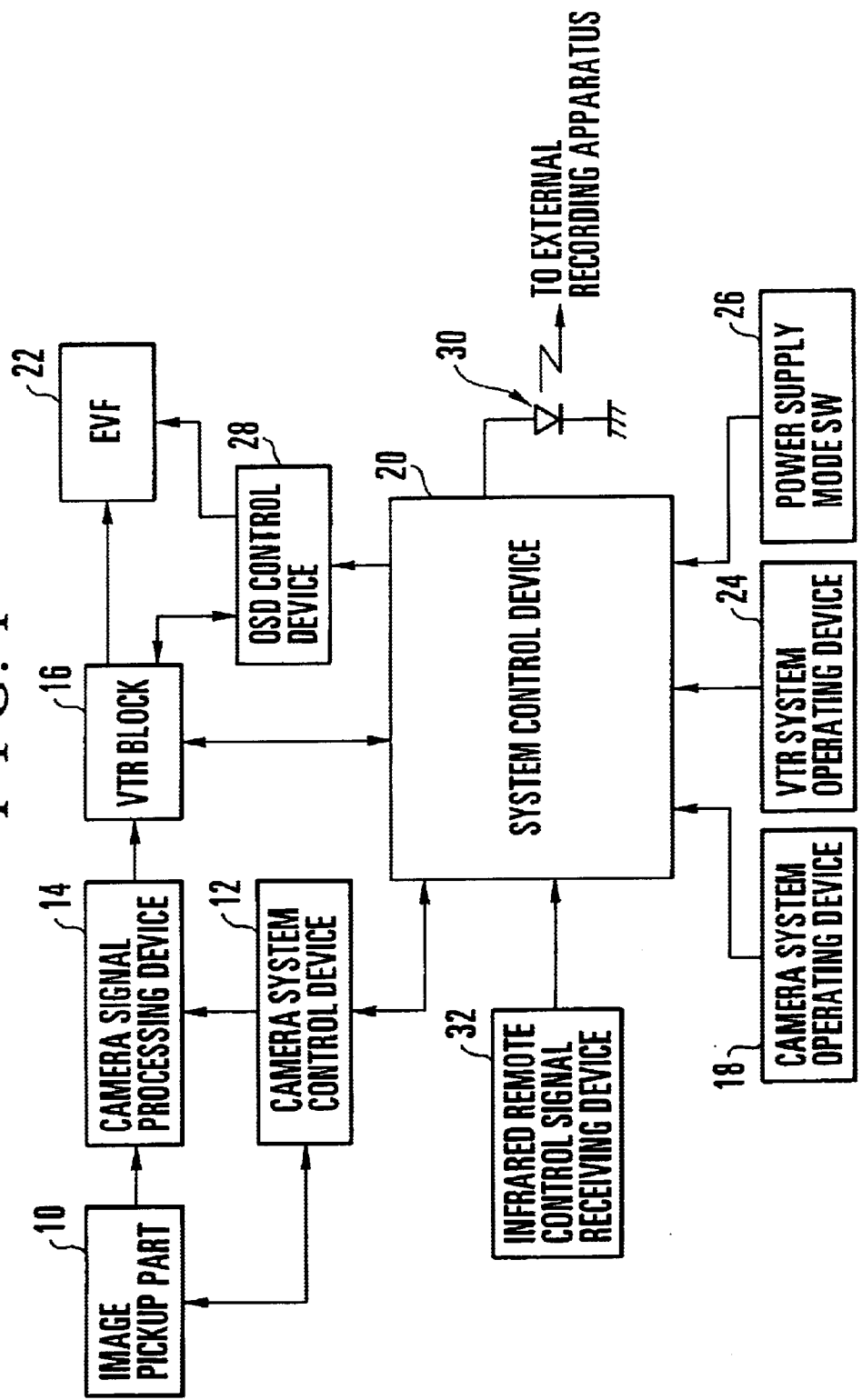
FIG. 1 is a block diagram showing in outline the arrangement of a camera-integrated type VTR (video tape recorder) which is arranged as an embodiment of the invention.

FIG. 1 is a block diagram showing in outline the arrangement of a camera-integrated type VTR arranged according to the invention as an embodiment thereof. Referring to FIG. 1, an image pickup part 10 is composed of an optical system lens, a CCD image sensor, an automatic focusing mechanism, a zooming mechanism, etc. The image pickup part 10 operates, in accordance with instructions from a camera system control device 12, to adjust focus, an amount of light, etc., for a field of view, to convert an optical image of the field of view obtained through the optical system lens into a video signal and to supply the video signal to a camera signal processing device 14. The camera signal processing device 14 then processes the video signal in a predetermined manner in accordance with instructions from the camera system control device 12, and supplies the processed video signal to a VTR block 16.

A camera system operating device 18 is composed of various switches and dials (for AF on/off, AE auto/lock and programmed AE actions, etc.). A system control device 20 is arranged to supply the camera system control device 12 with information on an operation performed by the operator on the camera system operating device 18. The camera system control device 12 is composed of a microcomputer, etc., and is arranged to control the entire camera system according to instructions coming from the system control device 20 and the camera system operating device 18.

The VTR block 16 includes, among others, a mechanism part, a mechanism driving part arranged to drive the mechanism part, a mechanism part servo control device composed mainly of a microcomputer, and a video and audio signal processing part. In accordance with the instructions from the system control device 20, the VTR block 16 records and reproduces video signals on and from a recording medium, sends the video signals to an EVF (electronic viewfinder) 22 and also sends out the video signals from an output terminal which is not shown.

A VTR system operating device 24 is composed of switches of varied kinds related to the VTR system and the whole apparatus (including up, down, right, left, execution, menu, reproduction (playback), fast-feeding/reverse-feeding, pause and start/stop switches). Information on any operation that is performed on the VTR system operating device 24 by the operator is supplied to the system control device 20. A power supply mode switch 26 is provided for allowing the operator to select the power supply mode of the main body of the VTR (including on/off switching of power for the camera, VTR and editing). Information on the selected state of the switch 26 is supplied to the system control device 20. An OSD (on-screen display) control device 28 is arranged to convert information of varied kinds of the main body into display character signals and to supply these signals to the EVF (electronic viewfinder) 22 in accordance with the instructions of the system control device 20. The OSD control device 28 also supplies the VTR block 16 with character signals to be recorded, such as a title, a date, etc.

The EVF 22 is composed of either a CRT or a liquid crystal display panel or the like which is arranged to show video images to the operator. The EVF 22 displays not only the display of video images but also information of varied kinds in characters and symbols and guide information when a menu is set there.

The system control device 20 is composed of a microcomputer for total control over the above-stated various parts and has various functions, such as a timer function as will be described later herein. The system control device 20 is thus arranged to control the power supply mode, a shift to the operating mode of the VTR block 16, various information displays, an editing mode, various shooting modes, storing and holding an editing program, etc. The system control device 20 is further arranged to supply an infrared remote control signal generating device 30 with signals for remotely operating an external recording apparatus. The infrared remote control signal generating device 30 is thus caused to transmit control signals to an outside space with infrared rays used as a carrier wave. An infrared remote control signal receiving device 32 is arranged, on the other hand, to receive infrared remote control signals from the outside and to supply the system control device 20 with data codes corresponding to the infrared remote control signals received.

Figure 2:
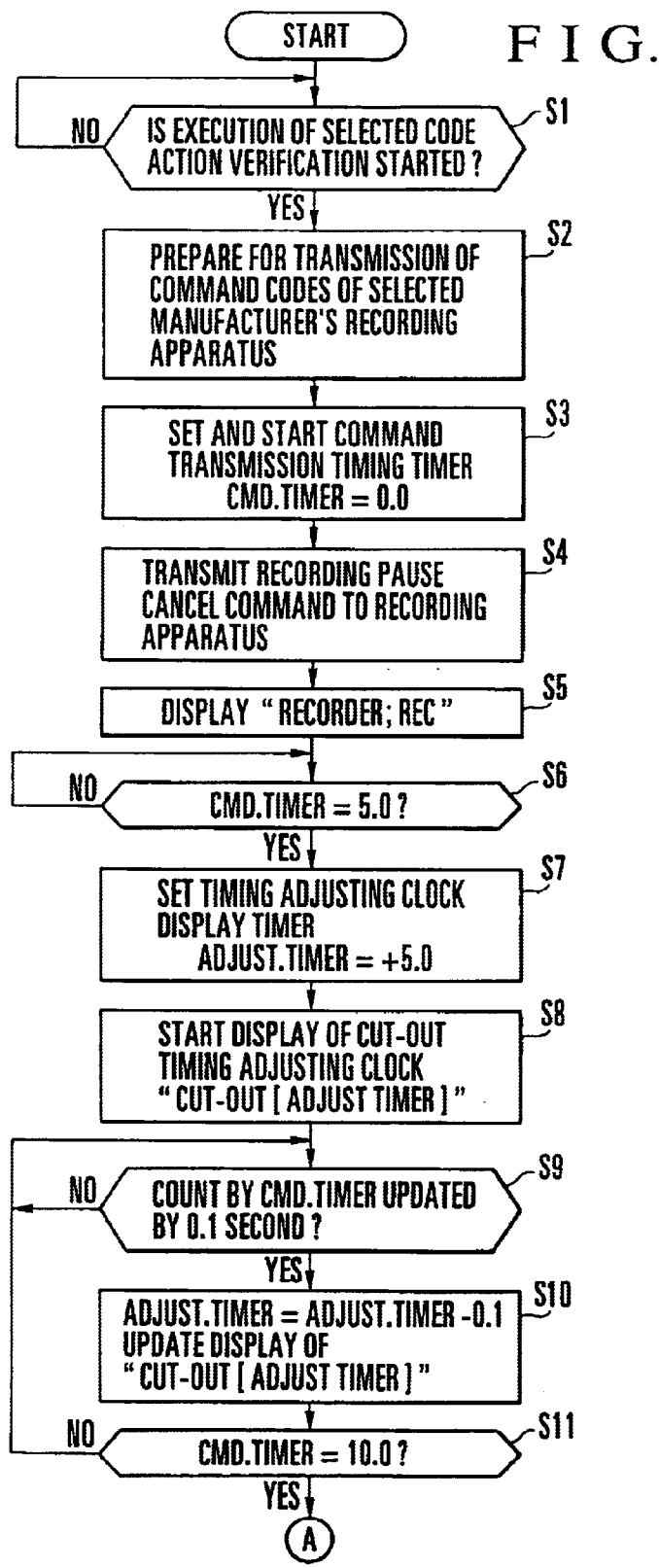
FIG. 2 is a flow chart showing a part of a flow of operation of the embodiment.
Figure 3:
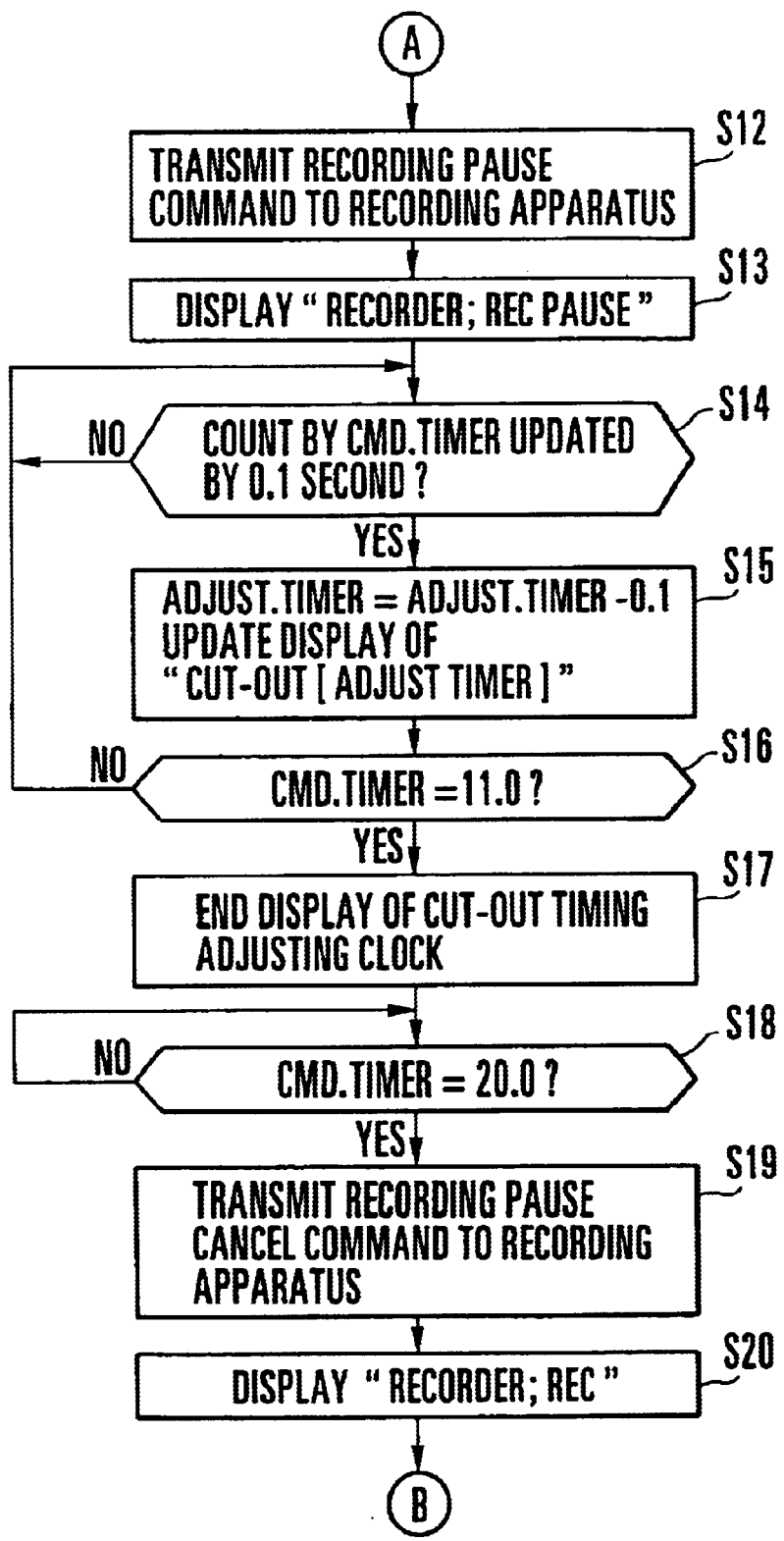
FIG. 3 is a flow chart showing another part of the flow of operation of the embodiment.
Figure 4:
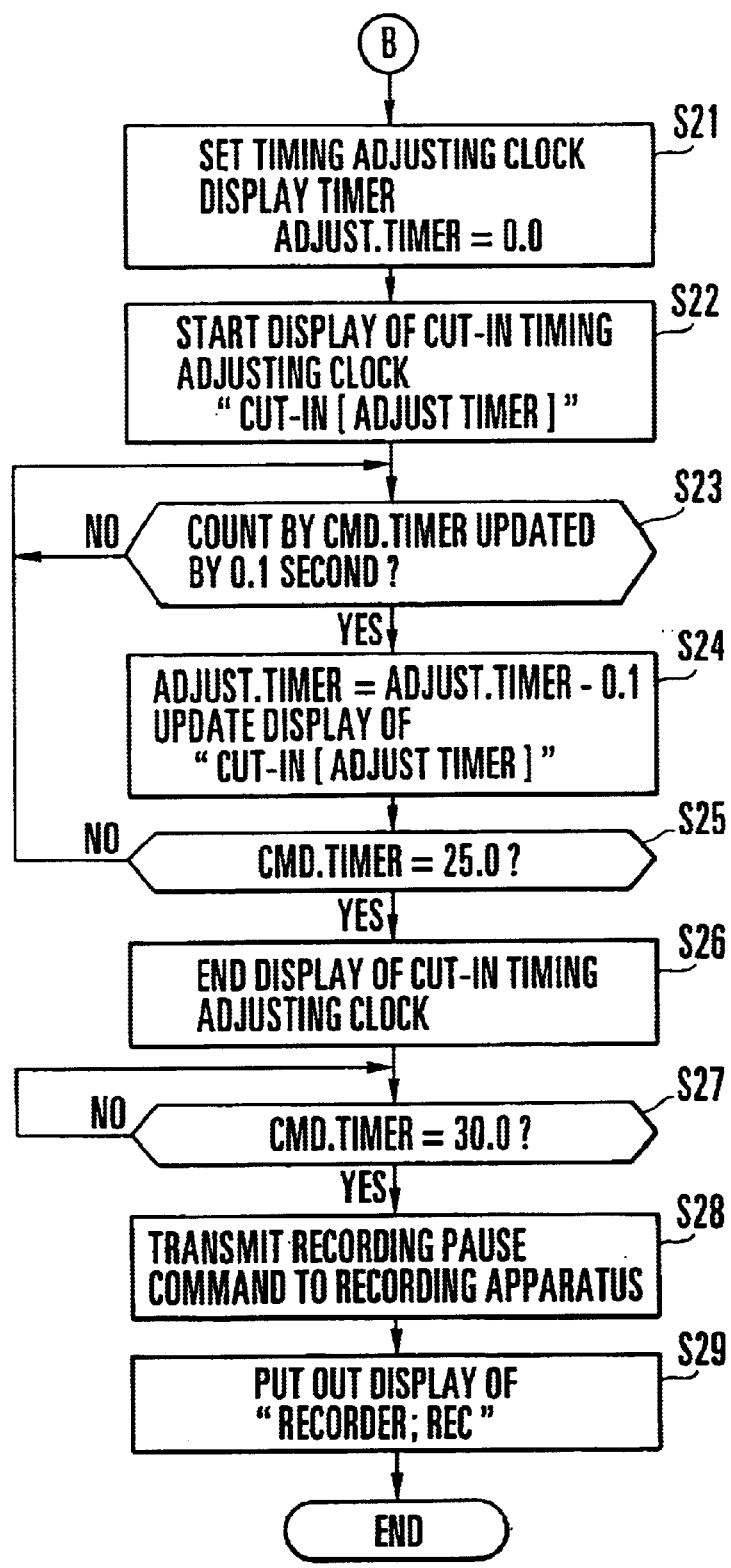
FIG. 4 is a flow chart showing a further part of the flow of operation of the embodiment.
Figure 7:
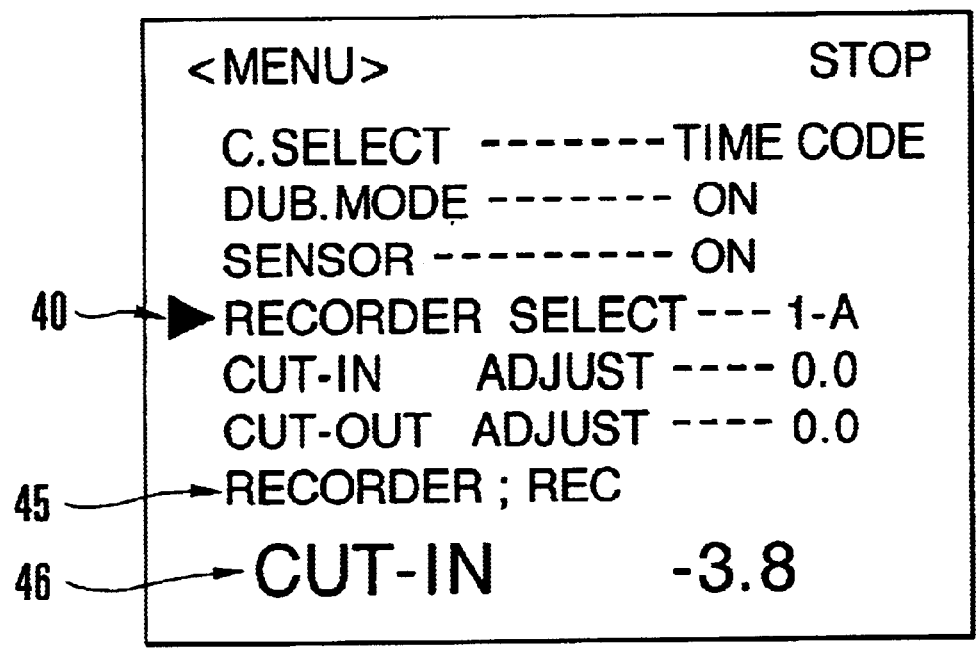
FIG. 7 shows a further example of a display made in the editing menu mode in the embodiment.
Figure 8:
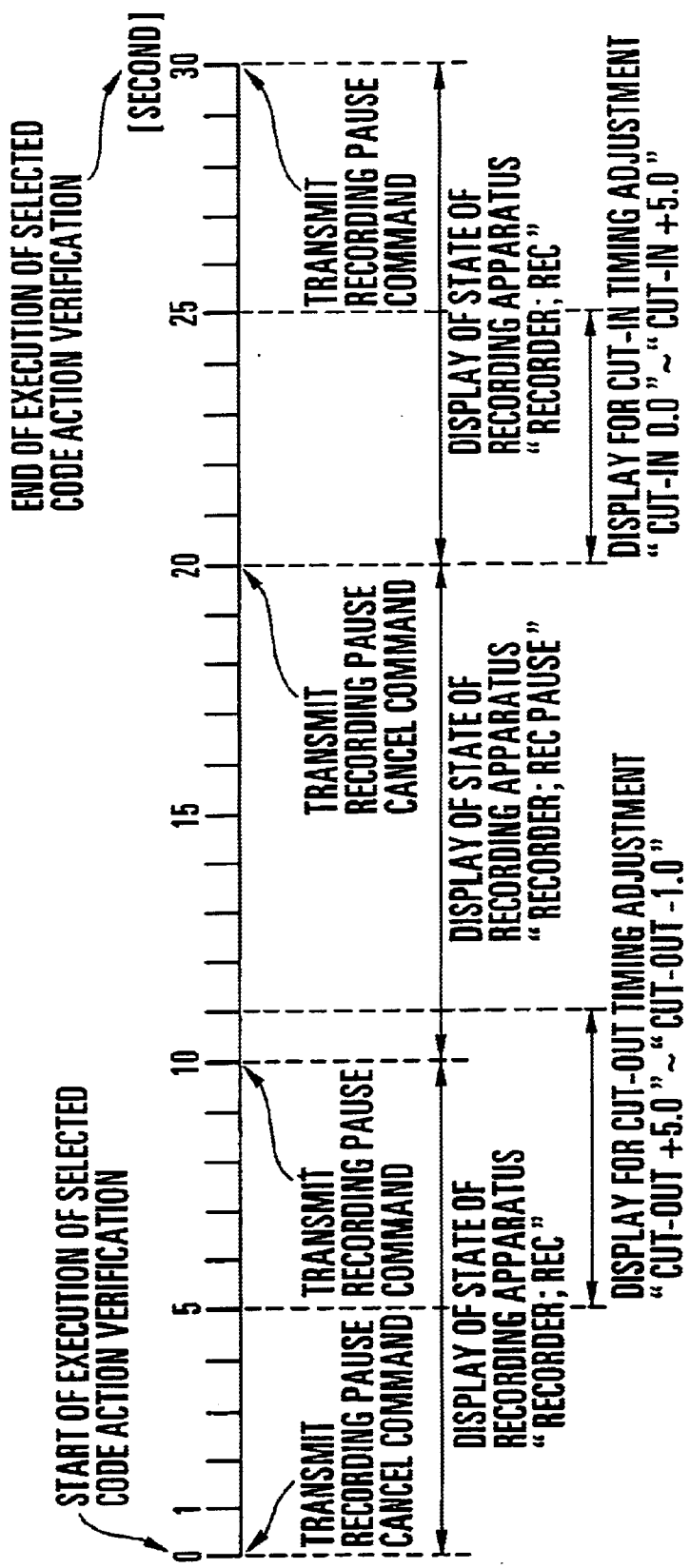
FIG. 8 shows action timing in the embodiment.

FIGS. 2, 3 and 4 are flow charts jointly showing a flow of operation of the embodiment of the invention. FIGS. 5, 6 and 7 show examples of displays made while the operation of the embodiment is in process. FIG. 8 is a timing chart showing various actions of the embodiment.

Remote operation command codes applicable to the respective recording apparatus in use vary with the manufacturers of recording apparatuses. In the case of the embodiment, remote operation command codes of applicable manufacturers are arranged to be selected by using one item on a menu. Referring to FIGS. 5, 6 and 7 which show menu pictures, when a menu cursor 40 is located at an item reading "RECORDER SELECT", if an execution key of the VTR system operating device 24 is pushed by the operator, a selected code action verification is executed.

Referring to FIG. 2, at a step S1, a check is made to find if an operation is performed to start the execution of the selected code action verification. If so, the flow proceeds to a step S2. At the step S2, preparation is made for transmission of the remote operation command codes of the recording apparatus of the manufacturers currently being selected. At a step S3, a command transmission timing timer CMD. TIMER is initialized to 0.0 second and is then caused to start counting time. The timer CMD.TIMER operates within the system control device 20 to up count at every 0.1 second after the start. At a step S4, the system control device 20 causes the infrared remote control signal generating device 30 to transmit a recording pause cancel command to the recording apparatus at the same time as the step S3. At a step S5, a display reading "RECORDER; REC" is made at a section 42 of the menu picture which is provided for indicating an acting state in which the recording apparatus is to be operated upon receipt of the recording pause cancel command. At a step S6, the flow of operation waits until the count value of the command transmission timing timer CMD.TIMER reaches 5.0 seconds.

When the count value of the command transmission timing timer CMD.TIMER reaches 5.0 seconds, the flow proceeds to a step S7. At the step S7, a timing adjusting clock display timer ADJUST.TIMER is initialized to a value of +5.0. At a step S8, a cut-out timing adjusting clock is started to be displayed. The cut-out timing adjusting clock may be displayed in the same size as other character displays, and, however, is preferably displayed in a larger size than other character displays as shown at a section 44 in FIG. 5.

At a step S9, the flow waits until the count value of the command transmission timing timer CMD.TIMER is updated by 0.1 second. The flow then proceeds to a step S10. At the step S10, the count value of the timing adjusting clock display timer ADJUST.TIMER is decremented by 0.1. The display of the cut-out timing adjusting clock (for example, the section 44 in FIG. 5) is also updated. At a step S11, the steps S9 and S10 are repeated until the count value of the command transmission timing timer CMD.TIMER reaches 10.0 seconds.

When the count value of the command transmission timing timer CMD.TIMER is found to have reached 10.0 seconds at the step S11, the flow proceeds to a step S12 which is shown in FIG. 3.

At the step S12, a recording pause command is transmitted to the recording apparatus. At a step S13, the acting state in which the recording apparatus is to be operated upon receipt of the recording pause command is displayed as "RECORDER; REC PAUSE", as shown in a section 43 in FIG. 6. At a step S14, the flow waits until the count value of the command transmission timing timer CMD.TIMER is updated by 0.1 second. After updating of the timer, the flow proceeds to a step S15. At the step S15, the count value of the timing adjusting clock display timer ADJUST.TIMER is decremented by 0.1. The display of the cut-out timing adjusting clock (for example, the section 44 in FIG. 5) is also updated accordingly. At a step S16, the flow repeats the steps S14 and S15 until the count value of the command transmission timing timer CMD.TIMER reaches 11.0 seconds.

When the command transmission timing timer CMD. TIMER reaches 11.0 seconds, the flow proceeds to a step S17 to bring the display of the cut-out timing adjusting clock to an end. A display resulting from this step is shown in FIG. 6.

At a step S18, the flow waits until the count value of the command transmission timing timer CMD.TIMER reaches 20.0 seconds. When the command transmission timing timer CMD.TIMER reaches 20.0 seconds, the flow proceeds to a step S19. At the step S19, the recording pause cancel command is transmitted to the recording apparatus. At a step S20, the acting state in which the recording apparatus is to be operated upon receipt of the recording pause cancel command is displayed as "RECORDER; PAUSE", as shown in the section 44 in FIG. 7. Then, the flow proceeds to a step S21 which is shown in FIG. 4.

At the step S21, the timing adjusting clock display timer ADJUST.TIMER is initialized to 0.0 second. At a step S22, a cut-in timing adjusting clock is started to be displayed. As in the case of the cut-out timing adjusting clock, although the cut-in timing adjusting clock may be displayed in the same size as other display characters, it is preferably displayed in a larger size than other display characters, as shown in a section 46 in FIG. 7.

At a step S23, the flow waits until the count value of the command transmission timing timer CMD.TIMER is updated by 0.1 second. When the count value of the command transmission timing timer CMD.TIMER is updated, the flow proceeds to a step S24. At the step S24, the count value of the timing adjusting clock display timer ADJUST. TIMER is decremented by 0.1. The display of the cut-in timing adjusting clock, which is, for example, as shown in the section 46 in FIG. 7, is also updated accordingly. At a step S25, the steps S23 and S24 are repeated until the count value of the command transmission timing timer CMD. TIMER reaches 25.0 seconds.

When the count value of the command transmission timing timer CMD.TIMER has reached 25.0 seconds at the step S25, the flow proceeds to a step S26 to put out the display of the cut-in timing adjusting clock. At a step S27, the flow waits until the count value of the command transmission timing timer CMD.TIMER reaches 30.0 seconds.

When the count value of the command transmission timing timer CMD.TIMER reaches 30.0 seconds, the flow proceeds to a step S28 to transmit the recording pause command to the recording apparatus. At a step S29, the display of the acting state in which the recording apparatus is to be operated is put out, and the selected code action verification comes to an end.

Further, the signals for the displays of various kinds are line-outputted. Therefore, a recording medium for timing adjustment can be perfectly completed by connecting the display signals to the line inputs of the recording apparatus and actually performing a recording action under the work of the above-stated selected code action verification. Incidentally, when a signal recorded on the recording medium for timing adjustment is reproduced, clock display data which is obtained at a change-over point from the display of the cut-out timing adjusting clock to the display of the cut-in timing adjusting clock becomes a timing adjustment value applicable to each adjustment of timing. Therefore, the data thus obtained is set as timing adjustment data for each timing.

Figure 9:
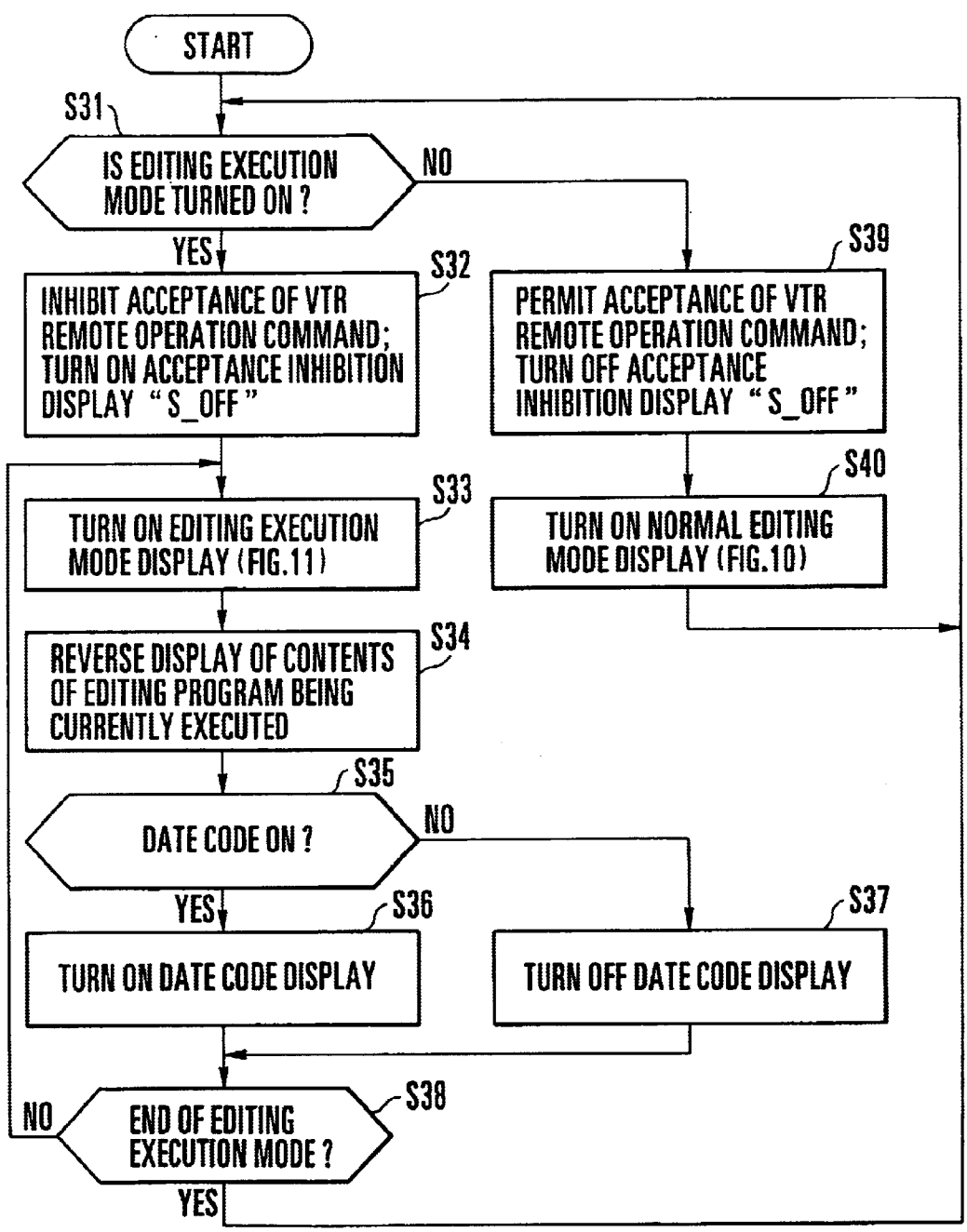
FIG. 9 is a flow chart showing a flow of operation in the editing mode in the embodiment.
Figure 10:
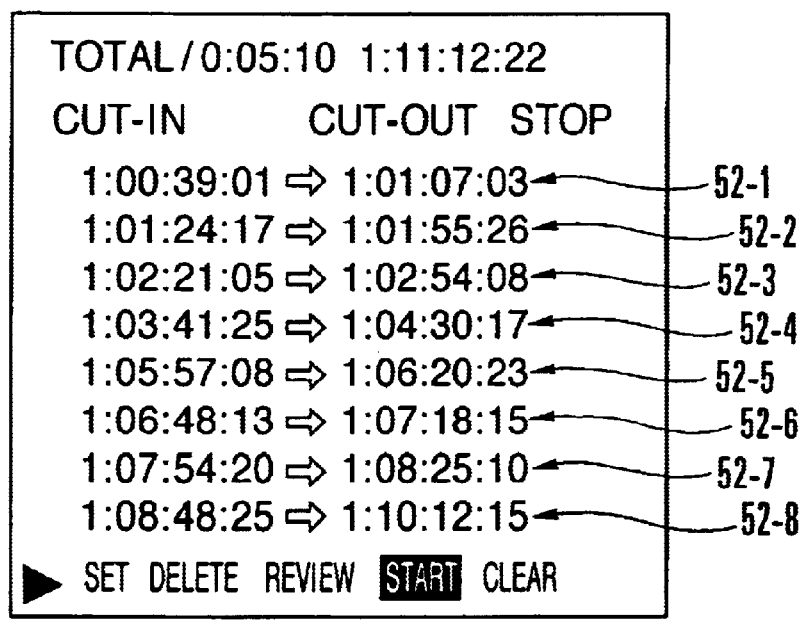
FIG. 10 shows an example of a display made in the editing mode in the embodiment.
Figure 11:
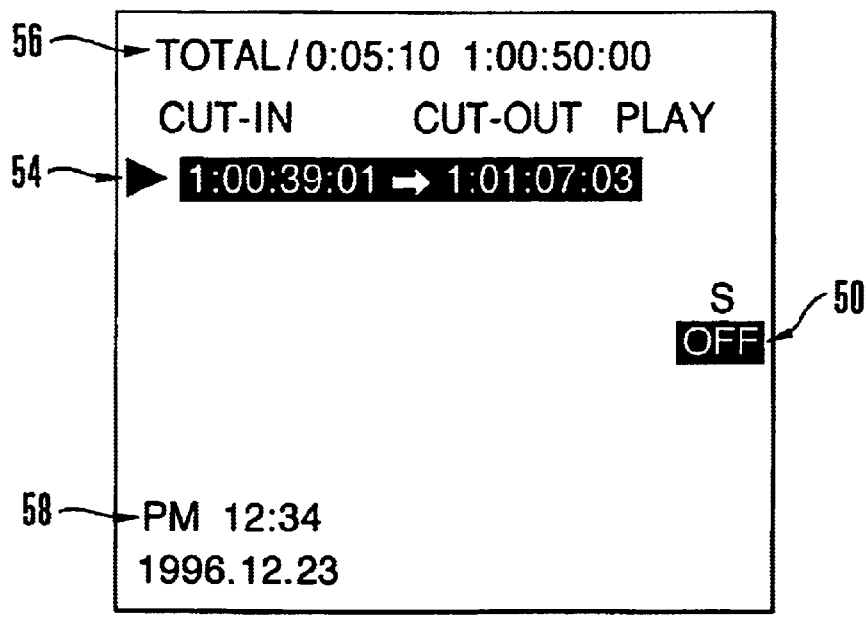
FIG. 11 shows another example of a display made in the editing mode in the embodiment.

FIG. 9 is a flow chart showing an operation in the editing mode in the embodiment. FIGS. 10 and 11 show by way of example displays made during the operation.

Referring to FIG. 9, at a step S31, a check is made to find if an editing execution mode is turned on by the execution key of the VTR system operating device 24. If not, the flow of operation proceeds to a step S39. At the step S39, the VTR is permitted to accept remote operation commands, and a display "S_OFF" indicating inhibition of acceptance of remote operation commands, shown at a part 50 in FIG. 11, is put out. Then, the flow proceeds to a step S40 to shift the mode of display to a normal editing mode display as shown in FIG. 10, and returns to the step S31. In the display shown in FIG. 10, display parts 52-1 to 52-8 indicate the contents of a preset editing program. As shown, editing program parts No. 1 to No. 8 have already been registered. In the case of FIG. 10, the whole space of the picture has already been fully used for display of information. There is left no room for any more information display.

If the editing execution mode is found at the step S31 to have been turned on by the execution key of the VTR system operating device 24, the flow proceeds to a step S32. At the step S32, the system control device 20 inhibits acceptance of remote operation commands at the VTR for the purpose of preventing the editing work from being suspended by any erroneous operation from the outside. At the same time, the system control device 20 causes the command acceptance inhibition display "S_OFF" to be turned on, as shown at the display part 50 in FIG. 11.

At the next step S33, an editing execution mode display is turned on as shown in FIG. 11. At a step S34, only the display of a part of the editing program currently in process of execution is inverted as shown by way of example at a part 54 in FIG. 11. In the case of this display example, the editing program is indicated at a part 56 and a part of the editing program which is currently in process of execution is shown in an inverted state at the part 54 in FIG. 11. The inverted display part clearly shows that the first part of the editing program is now in process of execution.

At a step S35, a check is made to find if a date code has been turned on. If so, the flow proceeds to a step S36 to turn on a display of date code as shown at a part 58 in FIG. 11. If not, the flow proceeds to a step S37 to put out the display of date code. At the next step S38, a check is made to find if the editing action of the whole editing program has been finished. If not, the flow returns to the step S33 to repeat the step S33 and steps subsequent thereto. If so, the flow returns to the step S31.

As will be readily understood from the foregoing description, the start and end of the verifying work on the action of the command codes selected to be actually used become clear, so that the reliability of the verifying action can be enhanced by the arrangement of the embodiment described above.

Further, the arrangement for making a display of clock adjusted to the timing of transmission of the command codes while the selected code action verification is in process enables the editing work to be accurately carried out, because a recording medium which facilitates timing adjustment for accurate editing work can be prepared at the same time as the process of the selected code action verification by virtue of the arrangement described above.

The arrangement for making a clock display in a size larger than a normal character display size permits easy clock confirmation during the process of setting a timing adjusting value.

The arrangement for providing a means for inhibiting acceptance of commands while the editing work is in process (in the editing execution mode) effectively enables the operator to clearly know whether acceptance of commands is being inhibited or not.

The arrangement for making a display provided during the process of setting the editing program (editing program setting mode) different from a display provided during the process of executing the editing work (editing execution mode) enables some item that cannot be displayed in the editing program setting mode because of the limited space but must be displayed in the editing execution mode, such as a date display, to be displayed as necessary.

What is claimed is:

1. A reproducing apparatus, comprising:
   reproducing device for reproducing an image signal from a recording medium;
   output means for outputting the image signal reproduced by said reproducing device to a recording apparatus, said recording apparatus recording the image signal outputted from said output means;
   transmitting means for transmitting a control command, which changes an operating state of said recording apparatus, produced by said reproducing device;
   control means, which is provided in said reproducing device, for controlling a recording operation of said recording apparatus by transmitting the control command to said recording apparatus through said transmitting means; and
   display means for displaying state information corresponding to the control command for controlling said recording apparatus and state information of a reproducing operation of said reproducing device while an editing operation is carried out.

2. An apparatus according to claim 1, wherein said control means controls the reproducing operation of said reproducing device and the recording operation of said recording apparatus according to editing programs.

3. An apparatus according to claim 1, wherein said control means controls the recording operation of said recording apparatus by a wireless control.

4. An apparatus according to claim 1, wherein said control means controls the reproducing operation of said reproducing device according to editing programs and said display means displays information relating to the editing programs.

5. An apparatus according to claim 1, wherein said display means displays time information relating to the control command.

6. An apparatus according to claim 2, wherein said control means selects one of a plurality of editing programs, and controls the reproducing operation of said reproducing device and the recording operation of said recording apparatus according to a selected editing program, and further comprising display control means controls said display means so as to display information of the selected editing program and inhibit displaying information of non-selected editing programs from the plurality of editing programs.

7. An apparatus according to claim 1, wherein said reproducing device produces a recording command and/or a recording pause command for controlling the recording operation of said recording apparatus.

8. An apparatus according claim 1, further comprising selecting means for selecting at least one recording apparatus from among a plurality of kinds of recording apparatuses, wherein said reproducing device produces the control command corresponding to said recording apparatus selected by said selecting means, and said display means displays state information corresponding to the control command during controlling the recording operation of said recording apparatus selected by said selecting means.

9. An apparatus according to claim 2, wherein said control means selects one of the editing programs for controlling the reproducing operation of said reproducing device and the recording operation of said recording apparatus by transmitting the control command according to a selected editing program, said control means inhibits controlling of non-selected editing programs during an execution of the selected editing program.

10. An apparatus according to claim 9, wherein said control means controls said reproducing device and said recording apparatus according to an operation of a remote commander.

11. An apparatus according to claim 9, wherein said reproducing apparatus is capable of being controlled according to an operation of a remote commander, said display means displays information relating to the selected editing program and information of inhibition of the control by the remote commander during an editing process according to the selected editing program.

12. An image editing method comprising the steps of:
    reproducing an image signal from a recording medium by a reproducing device;
    outputting the image signal reproduced by said reproducing device in said reproducing step to a recording apparatus, said recording apparatus recording the image signal outputted in said outputting step;
    transmitting a control command, which changes an operating state of said recording apparatus, produced by said reproducing device;
    controlling a recording operation of said recording apparatus by transmitting the control command outputted from said reproducing device to said recording apparatus through said transmitting step; and
    displaying state information corresponding to the control command so as to indicate the operating state of said recording apparatus and state information of a reproducing operation of said reproducing device while an editing operation is carried out.

13. A storage medium storing a computer readable program for controlling an image editing method comprising the steps of:
    reproducing an image signal from a recording medium by a reproducing device;
    outputting the image signal reproduced by said reproducing device in said reproducing step to a recording apparatus, said recording apparatus recording the image signal outputted in said outputting step;

transmitting a control command, which changes an operating state of said recording apparatus, produced by said reproducing device;

controlling a recording operation of said recording apparatus by transmitting the control command outputted from said reproducing device to said recording apparatus through said transmitting step; and displaying state information corresponding to the control command so as to indicate the operating state of said recording apparatus and state information of a reproducing operation of said reproducing device while an editing operation is carried out.

14. A reproducing apparatus, comprising:

reproducing device for reproducing an image signal from a recording medium and outputting a reproduced image signal to an external recording apparatus which records the image signal outputted from said reproducing device;

controller, which is provided in said reproducing device, for producing a control command for changing an operating state of said external recording apparatus; and display device, which is connected to said reproducing device, for displaying recording state information corresponding to the control command for controlling said recording apparatus, reproducing state information of said reproducing device and information related to an editing operation;

wherein said reproducing device controls a recording operation of said external recording apparatus by transmitting the control command and a reproducing operation of said reproducing device according to an editing program, and controls said display device so as to display both said recording state corresponding to the control command and said reproducing state of said reproducing device on a same operation display of said display device while the editing operation is carried out.

15. An apparatus according claim 14, wherein said reproducing apparatus is video camera, said display device is electronic viewfinder.

16. An apparatus according claim 14, wherein, said reproducing device controls the recording operation of said external recording apparatus by a wireless control.

17. An apparatus according to claim 14, wherein said reproducing device controls the reproducing operation of said reproducing device and the recording operation of said external recording apparatus according to operation of a remote commander.

18. An apparatus according to claim 14, wherein said controller produces a recording command and/or a recording pause command for controlling the recording operation of said external recording apparatus.

* * * * *